US009134664B2

(12) United States Patent
Miura et al.

(10) Patent No.: US 9,134,664 B2
(45) Date of Patent: Sep. 15, 2015

(54) MEMBER FOR ELECTROPHOTOGRAPHY, FIXING DEVICE, AND ELECTROPHOTOGRAPHIC IMAGE FORMING APPARATUS

(71) Applicant: CANON KABUSHIKI KAISHA, Tokyo (JP)

(72) Inventors: Jun Miura, Kawasaki (JP); Katsuhisa Matsunaka, Inagi (JP); Katsuya Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/158,098

(22) Filed: Jan. 17, 2014

(65) Prior Publication Data

US 2014/0133892 A1 May 15, 2014

Related U.S. Application Data

(63) Continuation of application No. PCT/JP2013/004488, filed on Jul. 23, 2013.

(30) Foreign Application Priority Data

Jul. 27, 2012 (JP) ................................ 2012-167214
Jul. 19, 2013 (JP) ................................ 2013-150189

(51) Int. Cl.
*G03G 15/20* (2006.01)
*B32B 27/00* (2006.01)

(52) U.S. Cl.
CPC .......... *G03G 15/206* (2013.01); *G03G 15/2057* (2013.01); *G03G 2215/2035* (2013.01); *Y10T 428/3154* (2015.04)

(58) Field of Classification Search
CPC ........... G03G 15/2057; G03G 15/206; G03G 2215/2048; G03G 2215/2051; G03G 2215/2054
USPC .................................. 399/333; 428/421, 500
See application file for complete search history.

(56) References Cited

U.S. PATENT DOCUMENTS 5,763,068 A 6/1998 Kishino et al.
6,328,682 B1 12/2001 Shudo (Continued)

FOREIGN PATENT DOCUMENTS

JP 63-165887 A 7/1988
JP 04353563 A * 12/1992

(Continued)

OTHER PUBLICATIONS

International Search Report in International Application No. PCT/JP2013/004488 (mailed Sep. 10, 2013).

(Continued)

*Primary Examiner* — Erika J Villaluna
(74) *Attorney, Agent, or Firm* — Fitzpatrick, Cella, Harper & Scinto

(57) ABSTRACT

Provided is a member for electrophotography including a fluorine resin surface layer formed by melting fluorine resin powder, the member being capable of stably maintaining rubber elasticity over a long time period. Further, provided are a fixing member, a fixing device, and an electrophotographic image forming apparatus each capable of stably providing the image quality of an electrophotographic image. The member for electrophotography is a member for electrophotography, comprising: a substrate; a cured silicone rubber elastic layer; and a fluorine resin surface layer obtained by melting a fluorine resin powder, wherein: when a microhardness of a cured rubber forming the cured silicone rubber elastic layer is defined as $H_{\mu 0}$, and a microhardness of a rubber obtained by soaking the cured rubber in a methyl hydrogen silicone oil for 24 hours, and then further curing the cured rubber is defined as $H_{\mu 1}$, $H_{\mu 1}/H_{\mu 0}$ is 2.5 or more and 5.0 or less.

10 Claims, 3 Drawing Sheets

(56) References Cited

U.S. PATENT DOCUMENTS

| | | | | |
|---|---|---|---|---|
| 6,911,240 | B2 | 6/2005 | Kondoh | |
| 7,725,068 | B2 | 5/2010 | Matsunaka et al. | |
| 7,991,341 | B2 | 8/2011 | Matsunaka et al. | |
| 2003/0228179 | A1 * | 12/2003 | Yaomin et al. ................ | 399/333 |
| 2005/0095381 | A1 | 5/2005 | Kondoh | |
| 2009/0110453 | A1 | 4/2009 | Kuntz et al. | |

FOREIGN PATENT DOCUMENTS

| | | | |
|---|---|---|---|
| JP | 8-328418 | A | 12/1996 |
| JP | 11-60955 | A | 3/1999 |
| JP | 2001-51538 | A | 2/2001 |
| JP | 2004-77886 | A | 3/2004 |
| JP | 2004-163715 | A | 6/2004 |
| JP | 2005-49382 | A | 2/2005 |
| JP | 2005-84294 | A | 3/2005 |
| JP | 4012744 | B2 | 11/2007 |
| JP | 2009-244887 | A | 10/2009 |
| WO | 2015/029412 | A1 | 3/2015 |

OTHER PUBLICATIONS

International Preliminary Report on Patentability in International Application No. PCT/JP2013/004488 (mailed Feb. 5, 2015).
Non-final Office Action in U.S. Appl. No. 14/568,933 (issued Jun. 23, 2015).

* cited by examiner

MEMBER FOR ELECTROPHOTOGRAPHY, FIXING DEVICE, AND ELECTROPHOTOGRAPHIC IMAGE FORMING APPARATUS

CROSS-REFERENCE TO RELATED APPLICATIONS

This application is a continuation of International Application No. PCT/JP2013/004488, filed Jul. 23, 2013, which claims the benefit of Japanese Patent Application No. 2012-167214, filed Jul. 27, 2012 and Japanese Patent Application No. 2013-150189, filed Jul. 19, 2013.

BACKGROUND OF THE INVENTION

1. Field of the Invention

The present invention relates to a member for electrophotography, a fixing device, and an electrophotographic image forming apparatus.

2. Description of the Related Art

A heat fixing system has been generally employed in an electrophotographic apparatus. That is, a recording material holding an image formed with unfixed toner is introduced into a nip between a fixing member and a pressurizing member placed opposite to the fixing member in a fixing device. Then, in the nip, the toner is heated and pressurized to melt, and the molten toner is fixed onto the recording material.

In this connection, a member obtained as described below has been known as the fixing member or the pressurizing member (hereinafter referred to as "fixing member or the like"). An elastic layer containing a silicone rubber formed of a cured product of an addition-curing-type organopolysiloxane mixture and a surface layer formed by melting fluorine resin powder are placed on a substrate.

It should be noted that the silicone rubber formed of the cured product of the addition-curing-type organopolysiloxane mixture is hereinafter sometimes referred to as "cured silicone rubber." In addition, the elastic layer containing the cured silicone rubber is hereinafter sometimes referred to as "cured silicone rubber elastic layer."

The surface layer of each of the fixing member or the like having such configuration can be made thin. Accordingly, in the fixing member with which the unfixed toner image is brought into contact, by virtue of excellent elasticity of the cured silicone rubber elastic layer, the unfixed toner on the recording material can be enclosed and melt without being excessively squashed. Accordingly, shift and blur of an electrophotographic image caused by the excessive squash of the unfixed toner upon fixation can be suppressed. In addition, occurrence of melting unevenness of the toner can be suppressed because the fixing member can follow irregularities of fibers of paper as the recording material well. Further, in the case of a color electrophotographic apparatus, color mixability of multiple color toners on the recording material can be improved.

In this case, as disclosed in Japanese Patent Application Laid-Open No. H08-328418, Japanese Patent Application Laid-Open No. 2005-49382 and Japanese Patent No. 4012744, a heating step at a temperature of 300° C. to 350° C. (hereinafter, the step is referred to as "baking") is generally needed for melting the fluorine resin powder on the cured silicone rubber elastic layer.

SUMMARY OF THE INVENTION

By the way, in order that the stability of the quality of an electrophotographic image may be secured in the fixing member, the fluctuation of its surface hardness at the time of its long-term use needs to be suppressed. In addition, for that purpose, it is important to cause an unsaturated aliphatic group to exist in a certain amount in the cured silicone rubber elastic layer.

That is, when the fixing member is used over a long time period, a phenomenon in which the crosslinked structure of the silicone rubber is cleaved over time and hence the elasticity of the rubber gradually reduces (hereinafter sometimes referred to as "aging phenomenon") occurs. However, when the unsaturated aliphatic group exists in the cured silicone rubber elastic layer, the reconstruction of the crosslinked structure of the silicone rubber through the reaction of the unsaturated aliphatic group occurs in tandem with the cleavage of the crosslinked structure, whereby the rubber elasticity hardly reduces. Accordingly, it is of extremely important technological significance to cause the unsaturated aliphatic group to exist in the silicone rubber elastic layer.

In this context, as described in the foregoing, the baking step at high temperature is needed upon formation of the fluorine resin surface layer through the melting of the fluorine resin powder. However, an investigation conducted by the inventors of the present invention has found that the amount of the unsaturated aliphatic group in the cured silicone rubber elastic layer reduces through the baking step. Accordingly, even when an abundance of the unsaturated aliphatic group is incorporated into the cured silicone rubber elastic layer before the baking of the fluorine resin powder, the amount of the unsaturated aliphatic group reduces at the time of the baking, and in association with the aging of the silicone rubber, it becomes difficult to maintain the rubber elasticity stably in some cases. As a result, a change in hardness of the fixing member over time at the time of the long-term use of the fixing member enlarges and hence the quality of the electrophotographic image changes over time in some cases.

In addition, a considerable amount, e.g., 40 vol % or more of a heat-conductive filler may be added to the cured silicone rubber elastic layer for improving the heat conductivity of the fixing member. In such case, the amount of the rubber component as a main constituent for expressing the elasticity of the silicone rubber elastic layer in the silicone rubber elastic layer becomes relatively small. Accordingly, the change in the elasticity of the silicone rubber elastic layer when the aging phenomenon of the silicone rubber occurs becomes additionally remarkable, which may cause a large change in image quality of the electrophotographic image.

By the way, although the mechanism via which the amount of the unsaturated aliphatic group in the cured silicone rubber elastic layer reduces due to the baking of the fluorine resin powder has not been sufficiently elucidated at present, the inventors of the present invention have assumed the mechanism to be as described below.

The cured silicone rubber elastic layer is exposed to a temperature equal to or more than the heat resistant temperature of the cured silicone rubber at the time of the baking of the fluorine resin powder. At this time, in the cured silicone rubber layer containing a large amount of the unsaturated aliphatic group, a radical addition reaction between a methyl radical species ($\equiv Si—CH_2.$) produced by heat and the unsaturated aliphatic group (a vinyl group or $CH_2═CH—Si\equiv$ in many cases) occurs. As a result, a trimethylene structure ($\equiv Si—CH_2—CH_2—CH_2—Si\equiv$) is formed. It should be noted that the hardness of the cured silicone rubber elastic layer increases because the reaction bonds molecular chains.

It is assumed that the unsaturated aliphatic group present in the cured silicone rubber elastic layer is consumed by such radical addition reaction as described above and hence the amount of the unsaturated aliphatic group in the cured silicone rubber elastic layer reduces.

In view of the foregoing, the inventors of the present invention have conducted an investigation on the following. In a cured silicone rubber elastic layer of a fixing member having a substrate, the cured silicone rubber elastic layer, and a fluorine resin surface layer obtained by melting a fluorine resin powder, such an amount of an unsaturated aliphatic group that aging can be alleviated is certainly caused to exist.

As a result, the inventors have found that despite the fact that the fixing member has the fluorine resin surface layer obtained by melting the fluorine resin powder, the unsaturated aliphatic group can be caused to exist in the cured silicone rubber elastic layer to suppress the aging of the cured silicone rubber elastic layer effectively. The present invention has been made based on such finding.

In view of the foregoing, the present invention is directed to providing a member for electrophotography including a fluorine resin surface layer formed by melting fluorine resin powder, the member being capable of stably maintaining rubber elasticity over a long time period.

Further, the present invention is directed to providing a fixing member, a fixing device, and an electrophotographic image forming apparatus each capable of stably providing the image quality of an electrophotographic image.

According to one aspect of the present invention, there is provided a member for electrophotography, comprising:

a substrate;

a cured silicone rubber elastic layer; and a fluorine resin surface layer obtained by melting a fluorine resin powder, wherein:

when a microhardness of a cured rubber forming the cured silicone rubber elastic layer is defined as $H_{\mu 0}$, and a microhardness of a rubber obtained by soaking the cured rubber in a methyl hydrogen silicone oil for 24 hours, and then further curing the cured rubber is defined as $H_{\mu 1}$, $H_{\mu 1}/H_{\mu 0}$ is 2.5 or more and 5.0 or less.

According to another aspect of the present invention, there is provided a fixing device, comprising:

a fixing member;

a unit for heating the fixing member; and a pressurizing member placed opposite to the fixing member, wherein one, or each of both, of the fixing member and the pressurizing member comprises the above-described member for electrophotography.

According to further aspect of the present invention, there is provided an electrophotographic image forming apparatus, comprising the above-described fixing device.

According to the present invention, there is provided the member for electrophotography including a fluorine resin surface layer formed by melting fluorine resin powder, the member being capable of stably maintaining rubber elasticity over a long time period. Further, according to the present invention, provided are the fixing member, the fixing device, and the electrophotographic image forming apparatus each capable of stably providing the image quality of the electrophotographic image.

Further features of the present invention will become apparent from the following description of exemplary embodiments with reference to the attached drawings.

DESCRIPTION OF THE EMBODIMENTS

Figure 1:
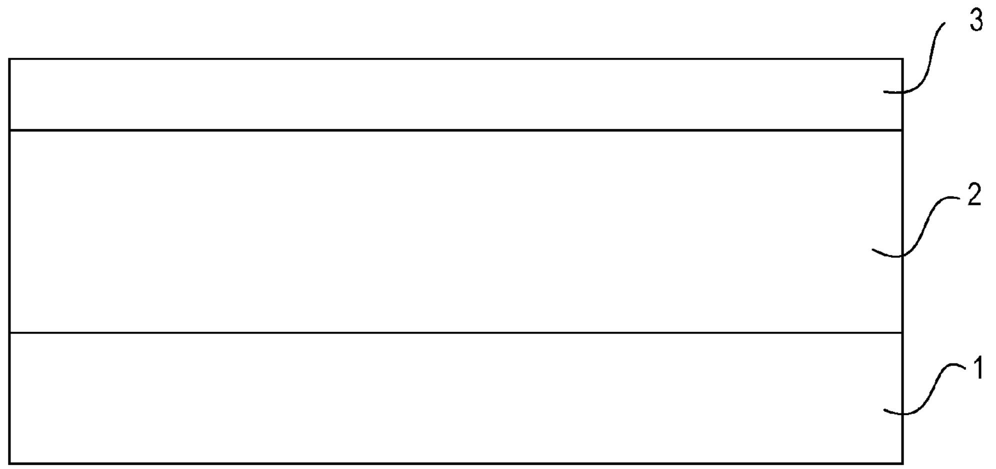
FIG. 1 is a schematic sectional view of a part of a fixing member according to the present invention.

Preferred embodiments of the present invention will now be described in detail in accordance with the accompanying drawings.

The inventors of the present invention have made various studies to achieve the objects. As a result, the inventors have found that when a specific filler is incorporated into a cured silicone rubber elastic layer containing an unsaturated aliphatic group, the unsaturated aliphatic group can be sufficiently caused to remain in the cured silicone rubber elastic layer even in the case where the cured silicone rubber elastic layer is placed in a high-temperature environment.

Specifically, an elastic layer containing a silicone rubber, i.e., a cured silicone rubber layer was obtained by heating a film formed on a substrate, the film containing an addition-curing-type organopolysiloxane mixture, a heat-conductive filler, and a filler for preventing consumption of unsaturated aliphatic group due to baking, to cause a hydrosilylation reaction in the film. Herein, the “a filler for preventing consumption of unsaturated aliphatic group due to baking” is sometimes referred to as “a filler for preventing consumption of unsaturated aliphatic group”.

It should be noted that the cured silicone rubber elastic layer according to the process is blended with a relatively small amount of a crosslinking component (organopolysiloxane having active hydrogen) so as to maintain elasticity even after curing, and hence contains an abundance of the unsaturated aliphatic group.

After that, a fluorine resin surface layer was formed by melting fluorine resin powder adhered to the surface of the cured silicone rubber elastic layer. As a result, it was found that even after the formation of the fluorine resin surface layer, the unsaturated aliphatic group remained in an unreacted state in the cured silicone rubber elastic layer and hence the hardness of the cured silicone rubber elastic layer changed to a small extent after the formation of the fluorine resin surface layer as compared with that before the formation. The present invention has been made based on such new finding.

It is still unable to sufficiently elucidate the reason why the incorporation of the filler for preventing consumption of unsaturated aliphatic group into the cured silicone rubber elastic layer can prevent the consumption of the unsaturated group in the cured silicone rubber elastic layer in the process for the melting of the fluorine resin powder. However, the inventors of the present invention have assumed that a radical addition reaction with the unsaturated aliphatic group is suppressed by an interaction between the filler for preventing consumption of unsaturated aliphatic group and a reaction factor consuming the unsaturated aliphatic group.

A conductive member to be used in a fixing member or the like according to the present invention has a substrate, an elastic layer containing a silicone rubber that is a cured product of an addition-curing-type organopolysiloxane mixture (cured silicone rubber elastic layer), and a fluorine resin surface layer obtained by melting a fluorine resin powder. In addition, when a microhardness of a cured rubber forming the cured silicone rubber elastic layer is defined as $H_{\mu 0}$, and a microhardness of a rubber obtained by soaking the cured rubber in a methyl hydrogen silicone oil for 24 hours, and then further curing the cured rubber is defined as $H_{\mu 1}$, $H_{\mu 1}/H_{\mu 0}$ is 2.5 or more and 5.0 or less.

According to the present invention, a reduction in elasticity due to the aging of the cured silicone rubber elastic layer can be suppressed because the cured silicone rubber elastic layer contains the unsaturated aliphatic group.

Details about the present invention are described with reference to the drawings.

(1) Outline of Configuration of Fixing Member;

FIG. 1 is a schematic sectional view of a fixing belt as one embodiment of a fixing member according to the present invention. In FIG. 1, a substrate is represented by reference numeral 1, a cured silicone rubber elastic layer that is cured and covers the peripheral surface of the substrate 1 is represented by reference numeral 2, and a fluorine resin surface layer is represented by reference numeral 3. It should be noted that the fixing member according to the present invention is similarly applicable to a pressurizing member similar to the configuration of such fixing member as described above.

(2) Substrate;

As the substrate, there may be used, for example, a metal or an alloy such as aluminum, iron, stainless steel, or nickel, or a heat-resistant resin such as a polyimide. When the fixing member has a belt shape, examples thereof include an electroformed nickel belt, a heat-resistant resin belt formed of a polyimide or the like, and a metal or alloy belt formed of stainless steel or the like. When the fixing member is a fixing roller or a pressurizing roller, a cored bar is used. A material for the cored bar is exemplified by a metal or an alloy such as aluminum, iron, or stainless steel.

In addition, the substrate may be subjected to a primer treatment prior to the formation of the cured silicone rubber elastic layer for its adhesion with the cured silicone rubber elastic layer.

(3) Cured Silicone Rubber Elastic Layer and Production Method Therefor;

The cured silicone rubber elastic layer according to the present invention contains a specific filler (the filler for preventing consumption of unsaturated aliphatic group) as an essential component.

In this case, the cured silicone rubber elastic layer functions as an elastic layer that provides the fixing member with such elasticity that toner is not squashed at the time of fixation. In order that such function may be expressed, the cured silicone rubber elastic layer preferably contains a silicone rubber that is a cured product of an addition-curing-type organopolysiloxane mixture. This is because the elasticity can be easily adjusted by adjusting its degree of crosslinking depending on the kind and addition amount of a filler to be described later. In addition, the cured silicone rubber elastic layer of the fixing member may have a sponge shape.

(3-1) Addition-Curing-Type Organopolysiloxane Mixture;

In general, the addition-curing-type organopolysiloxane mixture contains an organopolysiloxane having an unsaturated aliphatic group, an organopolysiloxane having active hydrogen bonded to silicon, and a cross-linking catalyst (such as a platinum compound).

Examples of the organopolysiloxane having an unsaturated aliphatic group include the following:

a linear organopolysiloxane in which both molecular terminals are represented by $(R^1)_2R^2SiO_{1/2}$ and intermediate units are represented by $(R^1)_2SiO$ and $R^1R^2SiO$; and a branched organopolysiloxane in which both molecular terminals are represented by $(R^1)_2R^2SiO_{1/2}$ and an intermediate unit includes a moiety represented by $R^1SiO_{3/2}$ or $SiO_{4/2}$.

In the formulae, $R^1$ represents a monovalent, unsubstituted or substituted hydrocarbon group bonded to a silicon atom and not including an unsaturated aliphatic group. Specific examples of $R^1$ include the following:

alkyl groups (such as methyl, ethyl, propyl, butyl, pentyl, and hexyl groups);

aryl groups (such as a phenyl group); and substituted hydrocarbon groups (such as chloromethyl, 3-chloropropyl, 3,3,3-trifluoropropyl, 3-cyanopropyl, and 3-methoxypropyl groups).

In particular, 50% or more of $R^1$'s preferably represent methyl groups because the organopolysiloxane is easily synthesized and handled, and provides excellent heat resistance, and all $R^1$'s particularly preferably represent methyl groups.

In addition, $R^2$ represents an unsaturated aliphatic group bonded to a silicon atom. Specific examples of $R^2$ include vinyl, allyl, 3-butenyl, 4-pentenyl, and 5-hexenyl groups. Of those, a vinyl group is preferred because the organopolysiloxane is easily synthesized and handled, and can be easily subjected to a crosslinking reaction.

In addition, the organopolysiloxane having active hydrogen bonded to silicon functions as a crosslinking agent that forms a crosslinked structure through a reaction with an alkenyl group of the organopolysiloxane component having an unsaturated aliphatic group by virtue of the catalytic action of the platinum compound. The number of hydrogen atoms bonded to a silicon atom is a number exceeding three on average in one molecule. An organic group bonded to a silicon atom is, for example, an unsubstituted or substituted, monovalent hydrocarbon group whose carbon number falls within the same range as that of $R^1$ of the organopolysiloxane component having an unsaturated aliphatic group. Of such groups, a methyl group is particularly preferred because the organopolysiloxane is easily synthesized and handled. The molecular weight of the organopolysiloxane having active hydrogen bonded to silicon is not particularly limited. In addition, the viscosity of the organopolysiloxane at 25° C. falls within the range of preferably 10 m/s or more to 100,000 m/s or less, more preferably 15 m/s or more to 1,000 m/s or less. This is because of the following reasons. There is no risk that the organopolysiloxane volatilizes during its storage, and hence a desired degree of crosslinking and desired physical properties of a molded article are not obtained. In addition, the organopolysiloxane is easily synthesized and handled, and can be uniformly dispersed in a system with ease.

A siloxane skeleton may be any one of linear, branched, and cyclic skeletons, and a mixture thereof may be used. Of those, the linear skeleton is particularly preferred because of its ease of synthesis. At least parts of Si—H bonds are preferably present in siloxane units at molecular terminals like $(R^1)_2HSiO_{1/2}$ units, though the bonds may each be present in any siloxane unit in a molecule.

The amount of the unsaturated aliphatic group of the addition-curing-type organopolysiloxane mixture is preferably 0.1 mol % or more and 2.0 mol % or less with respect to 1 mol of a silicon atom. The amount is particularly preferably 0.2 mol % or more and 1.0 mol % or less.

In addition, the organopolysiloxane is preferably blended at such a ratio that the ratio of the number of active hydrogens to the number of unsaturated aliphatic groups is 0.3 or more and 0.8 or less. The ratio of the number of active hydrogens to the number of unsaturated aliphatic groups can be determined and calculated by measurement employing proton nuclear magnetic resonance analysis (such as $^1$H-NMR (trade name: AL400 Type FT-NMR; manufactured by JEOL Ltd.)). Setting the ratio of the number of active hydrogens to the number of unsaturated aliphatic groups within the numerical range can stabilize the hardness of the cured silicone rubber elastic layer and can suppress an excessive increase of the hardness.

(3-2) Filler;

The cured silicone rubber elastic layer contains the filler for preventing consumption of unsaturated aliphatic group (hereinafter sometimes referred to as "first filler"), and can further contains a heat-conductive filler, a reinforcing filler, or the like to such an extent that the effects of the present invention are not impaired.

In addition, the cured silicone rubber elastic layer according to the present invention preferably has as high heat conductivity as possible, and the heat-conductive filler (hereinafter sometimes referred to as "second filler") is preferably incorporated for improving the heat conductivity in many cases.

(3-2-1) Filler for Preventing Consumption of Unsaturated Aliphatic Group (First Filler);

The filler for preventing consumption of unsaturated aliphatic group as the first filler has only to prevent the consumption of the unsaturated aliphatic group in the cured silicone rubber elastic layer upon baking of the fluorine resin powder.

Such filler for preventing consumption of unsaturated aliphatic group is an inorganic compound, and at least one selected from the group consisting of a titanium oxide particle, an iron oxide particle, a nickel oxide particle, a cobalt oxide particle, and a chromium oxide particle can be given as a specific example thereof. Titanium oxides are classified into anatase-type titanium oxide, rutile-type titanium oxide, and the like depending on their crystal structures. Of the inorganic compounds, titanium oxide (anatase-type or rutile-type), or iron(III) oxide exhibits an effect in preventing the consumption of the unsaturated aliphatic group due to the baking well. In particular, anatase-type titanium oxide exhibits an effect in preventing the consumption of the unsaturated aliphatic group due to the baking even when used in a small amount. When iron(III) oxide or rutile-type titanium oxide is used as the filler for preventing consumption of unsaturated aliphatic group, the filler is preferably incorporated in an amount of 4.5 parts by mass or more with respect to 100 parts by mass of the addition-curing-type silicone rubber mixture in order that an unsaturated aliphatic group-storing effect may be achieved additionally well.

In addition, when anatase-type titanium oxide is used as the filler for preventing consumption of unsaturated aliphatic group, the filler is preferably incorporated in an amount of 0.15 part by mass or more with respect to 100 parts by mass of the addition-curing-type silicone rubber mixture.

(3-2-2) Heat-Conductive Filler (Second Filler);

The heat-conductive filler as the second filler for improving the heat conductivity of the cured silicone rubber elastic layer preferably has high heat conductivity. Inorganic substance, in particular, a metal, a metal compound, or the like can be used as such filler.

Specific examples of the high heat-conductive filler include the following examples:

silicon carbide (SiC); silicon nitride ($Si_3N_4$); boron nitride (BN); aluminum nitride (AlN); alumina ($Al_2O_3$); zinc oxide (ZnO); magnesium oxide (MgO); silica ($SiO_2$); copper (Cu); aluminum (Al); silver (Ag); iron (Fe); and nickel (Ni).

One kind of those fillers can be used alone, or two or more kinds thereof can be used as a mixture. The average particle diameter of the high heat-conductive filler is preferably 1 μm or more and 50 μm or less from the viewpoints of handleability and dispersibility. In addition, with regard to its shape, a filler of, for example, a spherical shape, pulverized shape, needle shape, plate shape, or whisker shape is used. Of those, a filler of a spherical shape is preferred from the viewpoint of the dispersibility.

The heat-conductive filler is preferably incorporated at a content in the range of 40 vol % or more to 60 vol % or less with reference to the cured silicone rubber elastic layer into the cured silicone rubber elastic layer in order that its object may be sufficiently achieved.

(3-3) Thickness of Cured Silicone Rubber Elastic Layer;

The thickness of the cured silicone rubber elastic layer of the fixing member according to the present invention is preferably 100 μm or more and 500 μm or less, particularly preferably 200 μm or more and 400 μm or less in terms of: an influence of the cured silicone rubber elastic layer on the surface hardness of the fixing member; and the efficiency of heat conduction to unfixed toner at the time of the fixation.

When the fixing member is adopted as a pressurizing member, the thickness may be arbitrary as long as a nip width sufficient for the fixation of the toner can be obtained, and the thickness is generally 0.5 mm or more and 4 mm or less.

(3-4) Method of Producing Cured Silicone Rubber Elastic Layer;

A method of producing the cured silicone rubber elastic layer is as described below. A layer of a mixture containing, for example, the addition-curing-type organopolysiloxane mixture and the filler for preventing consumption of unsaturated aliphatic group is formed on the substrate by a known method. Examples of the known method include a ring coating method and a casting method. Next, a crosslinking reaction (hydrosilylation reaction) is progressed by heating the layer of the mixture with heating process such as an electric furnace for a certain time period. Thus, the cured silicone rubber elastic layer can be obtained.

(3-5) Degree of Existence of Unsaturated Aliphatic Group in Cured Silicone Rubber Elastic Layer;

A technology for direct determination of the amount of the unsaturated aliphatic group in the cured silicone rubber elastic layer after the baking to be performed for the formation of the fluorine resin surface layer does not exist for now. However, the amount can be indirectly determined by the following method.

First, multiple thin sections of the cured rubber each having predetermined sizes (e.g., 20 mm×20 mm) are cut out of the cured silicone rubber elastic layer of a member for electrophotography, and then the thin sections are laminated so that a thickness may be 2 mm. Then, the type C microhardness of the laminate of the cured rubber is measured with a microrubber hardness meter (trade name: Microrubber Hardness Meter MD-1 capa Type C; manufactured by KOBUNSHI KEIKI CO., LTD.). The value measured at this time is represented by $H_{\mu 0}$.

Next, all the thin sections of the cured rubber forming the laminate are completely soaked in a methyl hydrogen silicone oil (trade name: DOW CORNING TORAY SH 1107 FLUID; manufactured by Dow Corning Toray Co., Ltd.) for 24 hours. Specifically, the thin sections are left at rest in the methyl hydrogen silicone oil for 24 hours while the temperature of the oil is maintained at 30° C. Thus, the methyl hydrogen silicone oil is caused to permeate into each thin section. Next, all the thin sections are taken out of the methyl hydrogen silicone oil, the oil on the surface of each of the thin sections is sufficiently removed, the thin sections are heated in an oven at 200° C. for 4 hours, and then the thin sections are cooled to room temperature. Thus, an addition reaction between the unsaturated aliphatic group and the methyl hydrogen silicone oil is completed for all the thin sections.

Next, all the thin sections after curing are laminated, and then the microhardness of the resultant laminate of the cured rubber is measured with the apparatus. The microhardness at this time is represented by $H_{\mu 1}$. Then, a hardness increase ratio ($=H_{\mu 1}/H_{\mu 0}$) is calculated. In the case where the amount of the unsaturated aliphatic group in the silicone rubber elastic layer is large, a new crosslinking point is formed in a test piece by the methyl hydrogen silicone oil that has permeated into the test piece. Accordingly, the test piece after a heat treatment shows a significant hardness increase. In other words, the hardness increase ratio shows a relatively large value.

On the other hand, in the case where the amount of the unsaturated aliphatic group in the cured silicone rubber elastic layer is small, a new crosslinking point is hardly formed even when the methyl hydrogen silicone oil is caused to permeate into a test piece and the test piece is subjected to a heat treatment. Accordingly, a change in hardness of the test piece after the heat treatment is slight. In other words, the hardness increase ratio shows a relatively small value.

It should be noted that conditions and the like for a measurement for the calculation of the hardness increase ratio are not limited to those described above as long as the unsaturated aliphatic group in the test piece can be certainly subjected to a reaction.

In the present invention, the hardness increase ratio ($H_{\mu 1}/H_{\mu 0}$) is preferably 2.5 or more, particularly preferably 3.0 or more. This is because of the following reason: the unsaturated aliphatic group exists in a relatively abundant amount in the cured silicone rubber elastic layer and hence a reduction in rubber elasticity due to aging can be effectively suppressed. In addition, the hardness increase ratio ($H_{\mu 1}/H_{\mu 0}$) is preferably 5.0 or less, particularly preferably 4.5 or less in terms of the stability of the crosslinked structure of the cured silicone rubber elastic layer.

It should be noted that specific control of the hardness increase ratio can be specifically performed by the following (a) or a combination of the followings (a) and (b).

(a) The adjustment of the composition of an addition-curing-type silicone rubber undiluted solution to be used in the formation of the cured silicone rubber elastic layer;

More specifically, a mixing ratio between a vinylated polydimethylsiloxane having two or more vinyl groups per one molecule and an organohydrogenpolysiloxane having two or more Si—H bonds per one molecule in the addition-curing-type silicone rubber undiluted solution is adjusted.

(b) The kind and amount of the filler for preventing consumption of unsaturated aliphatic group in the cured silicone rubber elastic layer;

As described in the foregoing, the effect in preventing the consumption of the unsaturated aliphatic group due to the baking can be controlled depending on the kind and amount of the filler for preventing consumption of unsaturated aliphatic group.

(4) Fluorine Resin Surface Layer;

(4-1) Fluorine Resin Primer;

A primer layer may be formed between the fluorine resin surface layer and the cured silicone rubber elastic layer for adhesion between the two layers. Further, the surface of the cured silicone rubber elastic layer can be subjected to a UV treatment or a silane coupling agent treatment prior to the application of a fluorine resin primer for forming the primer layer.

(4-2) Fluorine Resin Surface Layer;

The fluorine resin surface layer can be formed by a known method.

Specifically, the fluorine resin surface layer can be formed by applying, drying, and melting a paint obtained by dispersing the fluorine resin powder in water or an organic solvent. It should be noted that the application can be performed with a spray.

A method except the foregoing method is permitted as long as the fluorine resin surface layer can be formed by melting the fluorine resin powder.

As described in the foregoing, the melting temperature of a melting step is generally 300 to 350° C. It is important to melt the fluorine resin powder at a temperature equal to or more than its melting point, and heating process such as a warm air-circulating oven or an infrared heater is available.

As the fluorine resin powder, there may be used, for example, a tetrafluoroethylene-perfluoro (alkyl vinyl ether) copolymer (PFA), a polytetrafluoroethylene (PTFE), or a tetrafluoroethylene-hexafluoropropylene copolymer (FEP). Of the materials listed above as examples, PFA is preferred from the viewpoints of moldability and toner releasability. In addition, two or more kinds of the materials listed above may be used as a blend, and an additive may be added as long as the effects of the present invention are not impaired.

The thickness of the fluorine resin surface layer is preferably set to 50 μm or less. This is because the elasticity of the cured silicone rubber elastic layer to serve as a lower layer upon lamination can be maintained and an excessive increase in surface hardness of the fixing member can be suppressed.

Figure 2:
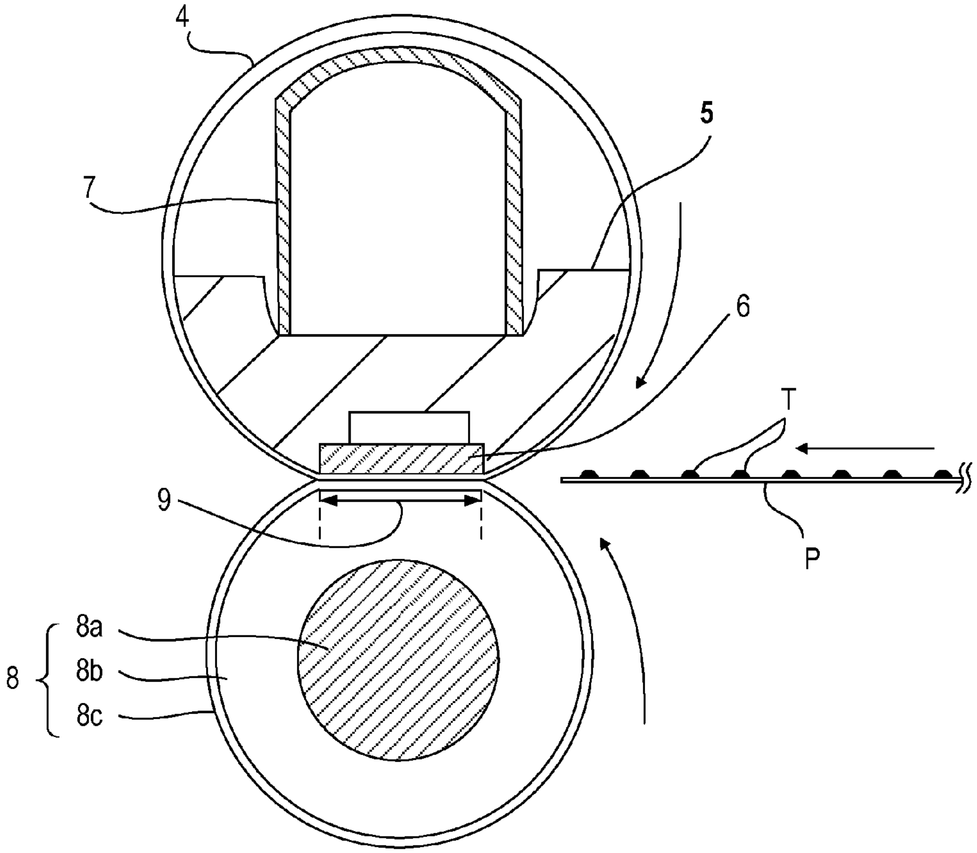
FIG. 2 is a schematic sectional view of a fixing device according to the present invention.

(5) Fixing Device;

FIG. 2 is a schematic sectional configuration view of a fixing device using the member for electrophotography according to the present invention as a fixing member. In FIG. 2, a member for electrophotography having a seamless shape (hereinafter referred to as "fixing belt") is represented by reference numeral 4.

A belt guide member 5 molded of a heat-resistant and heat-insulating resin for holding the fixing belt 4 is formed. A ceramic heater 6 as a heat source is provided at a position where the belt guide member 5 and the inner surface of the fixing belt 4 are brought into contact with each other. The ceramic heater 6 is fixed and supported by being engaged in a groove portion molded and provided along the longitudinal direction of the belt guide member 5, and is electrified by an unshown process to generate heat. The fixing belt 4 having a seamless shape is loosely fit onto the belt guide member 5. A rigid stay 7 for pressurization is inserted into the belt guide member 5. An elastic pressurizing roller 8 as a pressurizing member placed opposite to the fixing belt is reduced in surface hardness by providing a stainless cored bar **8*a* with a silicone rubber elastic layer 8*b***.

The elastic pressurizing roller 8 is provided while holding both end portions of the cored bar **8*a* with bearings so as to rotate freely between an unshown chassis side plate on a front side of the apparatus and an unshown chassis side plate on a rear side thereof. The elastic pressurizing roller 8 is covered with a fluorine resin tube having a thickness of 50 μm as a surface layer 8*c* for improving its surface property and releasability. The rigid stay 7 for pressurization is provided with a depressing force by providing a pressurizing spring (not shown) in a contracted manner between each of both end portions of the rigid stay 7 for pressurization and spring bearing members (not shown) on the chassis sides of the apparatus. Thus, the lower surface of the ceramic heater 6 as a unit for heating the fixing belt provided on the lower surface of the belt guide member 5 and the upper surface of the elastic pressurizing roller 8 are brought into press contact with each other across the fixing belt 4 to form a predetermined fixing nip portion 9. A recording medium P to serve as a member to be heated on which toner images have been formed with an unfixed toner T is conveyed into the fixing nip portion 9** while being sandwiched. Thus, the toner images are heated and pressurized. As a result, the toner images are subjected to melting and color mixing, and are then cooled, whereby the toner images are fixed onto the recording material.

It should be noted that in the fixing device according to the present invention, the member for electrophotography according to the present invention can be applied to the pressurizing member as well, or can be applied to each of both the fixing member and the pressurizing member.

Figure 3:
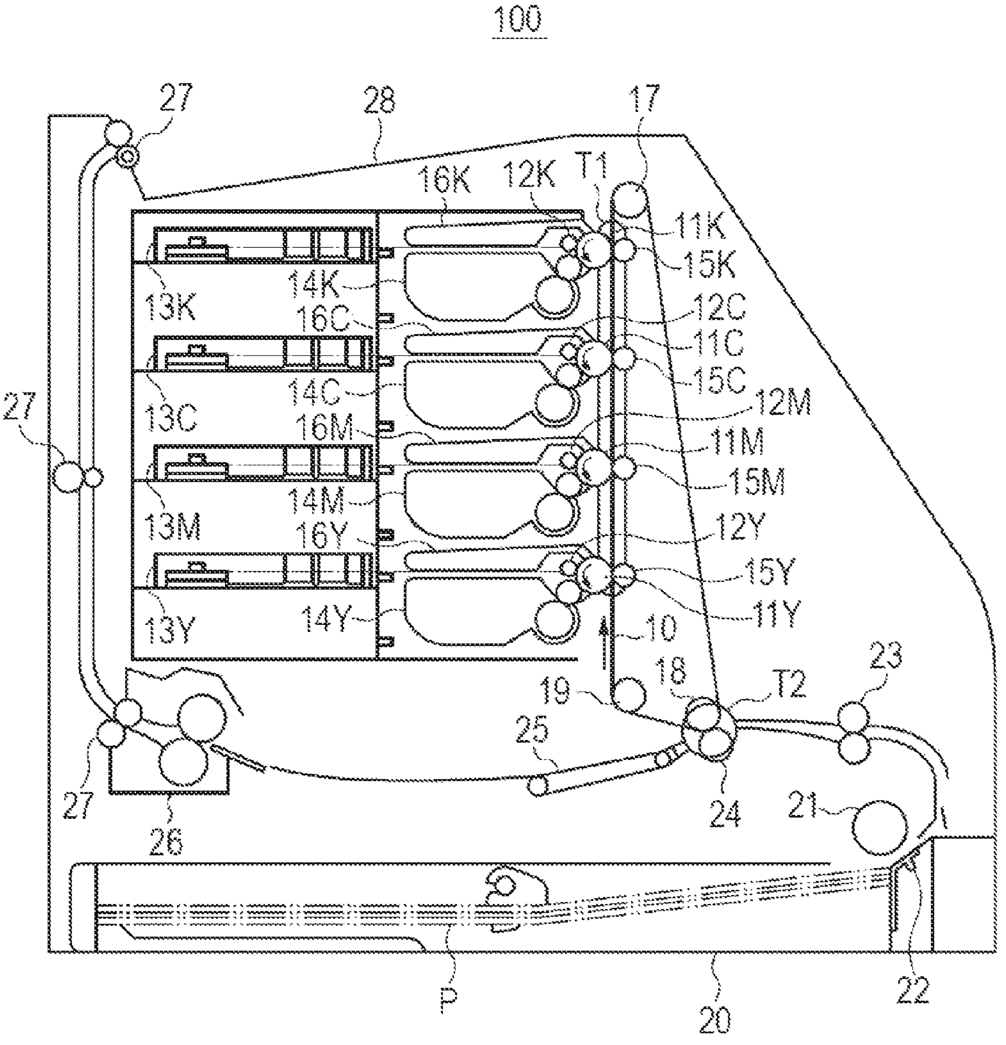
FIG. 3 is a schematic sectional view of an electrophotographic image forming apparatus according to the present invention.

(6) Electrophotographic Image Forming Apparatus;

The entire configuration of an electrophotographic image forming apparatus is schematically described. FIG. 3 is a schematic sectional view of a color laser printer according to this embodiment. A color laser printer (hereinafter referred to as "printer") 100 illustrated in FIG. 3 has an image forming portion having an electrophotographic photosensitive drum (hereinafter referred to as "photosensitive drum") that rotates at a constant speed for each of yellow (Y), magenta (M), cyan (C), and black (K) colors. In addition, the printer has an intermediate transfer member 10 for holding color images developed and subjected to multilayer transfer in the image forming portions, and further transferring the color images onto the recording medium P fed from a feeding device. The photosensitive drums 11 (11Y, 11M, 11C, and 11K) are each rotationally driven counterclockwise by driving device (not shown) as illustrated in FIG. 3.

Around each of the photosensitive drums 11, a charging device 12 (12Y, 12M, 12C, or 12K) that uniformly charges the surface of the photosensitive drum 11, a scanner unit 13 (13Y, 13M, 13C, or 13K) that irradiates the photosensitive drum 11 with a laser beam based on image information to form an electrostatic latent image thereon, a developing unit 14 (14Y, 14M, 14C, or 14K) that adheres toner to the electrostatic latent image to develop the image as a toner image, a primary transfer roller 15 (15Y, 15M, 15C, or 15K) that transfers the toner image on the photosensitive drum 11 onto the intermediate transfer member 10 at a primary transfer portion T1, and a unit 16 (16Y, 16M, 16C, or 16K) having a cleaning blade that removes transfer residual toner remaining on the surface of the photosensitive drum 11 after the transfer are placed in the stated order along the rotation direction of the photosensitive drum.

Upon image formation, the belt-shaped intermediate transfer member 10 suspended over rollers 17, 18, and 19 rotates, and the respective color toner images formed on the respective photosensitive drums are subjected to primary transfer onto the intermediate transfer member in a superimposed manner, whereby a color image is formed.

The recording medium is conveyed to a secondary transfer portion by a conveying device in synchronization with the primary transfer onto the intermediate transfer member 10. The conveying device has a feeding cassette 20 storing the multiple recording media P, a feeding roller 21, a separating pad 22, and a registration roller pair 23. At the time of the image formation, the feeding roller 21 is rotationally driven according to an image forming operation, the recording media P in the feeding cassette 20 are separated one by one, and the recording medium is conveyed to the secondary transfer portion by the registration roller pair 23 in timing with the image forming operation.

A movable secondary transfer roller 24 is disposed in the secondary transfer portion T2. The secondary transfer roller 24 can move in a substantially vertical direction. In addition, upon image transfer, the roller is pressed against the intermediate transfer member 10 through the recording medium P at a predetermined pressure. At the same time with the foregoing, a bias is applied to the secondary transfer roller 24 and hence the toner images on the intermediate transfer member 10 are transferred onto the recording medium P.

The intermediate transfer member 10 and the secondary transfer roller 24 are each driven. Accordingly, the recording medium P in a state of being sandwiched between the intermediate transfer member and the secondary transfer roller is conveyed at a predetermined speed in a leftward direction illustrated in FIG. 3, and the intermediate transfer medium is conveyed to a fixing portion 26 as a next step by a conveying belt 25. In the fixing portion 26, heat and pressure are applied to fix the transferred toner images onto the recording medium. The recording medium is discharged onto a discharge tray 28 on the upper surface of the apparatus by a discharge roller pair 27.

In addition, the application of the fixing device according to the present invention illustrated in FIG. 2 to the fixing portion 26 of the electrophotographic image forming apparatus illustrated in FIG. 3 can provide an electrophotographic image forming apparatus suitable for the maintenance of the quality of an electrophotographic image.

EXAMPLES

The present invention is described more specifically by way of Examples. A member for electrophotography used in the following experiments is used as such fixing belt as illustrated in FIG. 2.

Example 1

(1) The following materials (a) and (b) were blended so that the ratio (H/Vi) of the number of vinyl groups to the number of Si—H groups became 0.45, and then a catalytic amount of a platinum compound was added to the blend to provide a liquid addition-curing-type organopolysiloxane mixture.

(a) A vinylated polydimethylsiloxane having at least two or more vinyl groups per one molecule (weight-average molecular weight: 100,000 (in terms of polystyrene))

(b) An organohydrogenpolysiloxane having at least two or more Si—H bonds per one molecule (weight-average molecular weight: 1,500 (in terms of polystyrene))

Anatase-type titanium oxide (manufactured by Wako Pure Chemical Industries, Ltd.) as a filler for preventing consumption of unsaturated aliphatic group was blended in an amount of 0.15 part by weight into 100 parts by weight of the addition-curing-type organopolysiloxane mixture. Further, high-purity spherical alumina (trade name: Alunabeads CB-A10S; manufactured by Showa Titanium Co., Ltd.) was blended as a heat-conductive filler at a volume ratio of 45% with reference to a cured silicone rubber elastic layer, followed by kneading. Thus, a liquid mixture for forming a cured silicone rubber elastic layer was prepared.

A nickel electroformed endless belt having an inner diameter of 30 mm, a width of 400 mm, and a thickness of 40 μm whose surface had been subjected to a primer treatment was prepared as the substrate 1. It should be noted that during a series of production steps, the endless belt was handled while a core was inserted into the endless belt.

The liquid mixture for forming a cured silicone rubber elastic layer was applied onto the substrate 1 by a ring coating method to form a film having a thickness of 300 μm on the substrate. The substrate having formed thereon the film of the liquid mixture was placed in an electric furnace whose temperature was set to 200° C. and heated for 4 hours. Thus, a cured silicone rubber elastic layer was formed on the substrate.

After that, a dispersion of the PFA was applied through a fluorine resin primer with a spray. At this time, the application was performed so that a surface layer thickness became 15 μm. In addition, the melting point of PFA particles was measured with a differential scanning calorimeter (DSC823 manufactured by Mettler-Toledo). As a result, the melting point was 309° C.

The coating film containing the PFA particles was dried and then the PFA particles were melted. The melting was performed with a warm air-circulating oven at 330° C. for 15 minutes and quenching was performed with cold air to form a fluorine resin surface layer. Thus, a fixing belt according to the present invention was produced. The hardness of the fixing belt was measured with a type C microhardness meter (trade name: Microrubber Hardness Meter MD-1 capa Type C; manufactured by KOBUNSHI KEIKI CO., LTD.).

(2) The nickel electroformed endless belt and the fluorine resin surface layer were removed from the fixing belt obtained in the section (1) by cutting off an interface between the substrate and the cured silicone rubber elastic layer of the fixing belt, and an interface between the primer layer and the cured silicone rubber elastic layer thereof with a razor blade. The resultant endless belt-shaped cured silicone rubber had a thickness of about 270 μm. Multiple 20-mm square rubber pieces were cut out of the cured silicone rubber.

Next, the rubber pieces were laminated so as to have a thickness of 2 mm and the microhardness ($H_{\mu0}$) of the laminate was measured with the type C microhardness meter. The measured value showed 23.5°.

Next, a beaker into which 50 mL of a methyl hydrogen silicone oil (trade name: DOW CORNING TORAY SH 1107 FLUID; manufactured by Dow Corning Toray Co., Ltd.) had been charged was prepared. All the rubber pieces forming the laminate were placed in the beaker and soaked so that the entirety of each rubber piece was soaked. Then, the temperature of the oil in the beaker was maintained at 30° C. with a water bath whose temperature was set to 30° C., followed by standing for 24 hours.

After that, the rubber pieces were taken out of the methyl hydrogen silicone oil and the oil on the surface of each rubber piece was sufficiently wiped with a wiper (trade name: Kimwipe S-200; manufactured by NIPPON PAPER CRECIA Co., LTD.). Then, the respective rubber pieces were placed in an oven set to 200° C. and heated for 4 hours, followed by cooling to room temperature. The respective rubber pieces were taken out of the oven and laminated again, and the microhardness ($H_{\mu1}$) of the laminate was measured in the same manner as in the foregoing. The measured value showed 63.5°. Accordingly, the hardness increase ratio ($H_{\mu1}/H_{\mu0}$) of the cured silicone rubber elastic layer of the fixing belt according to Example 1 became 2.7.

(3) The fixing belt obtained in the section (1) was mounted on a color laser printer (trade name: Satera LBP5900, manufactured by Canon Inc.) and an electrophotographic image α was output. After that, the fixing belt was taken out, loaded into an electric furnace set to 230° C., and subjected to a heat resistance test in which heating was continued for 280 hours. After that, the surface hardness of the fixing belt was measured with the type C microhardness meter. As a result, the hardness showed a change of −2 as compared with that before the heat resistance test. The fixing belt 4 after the heat resistance test was mounted on the same color laser printer as that described above and an electrophotographic image β was output.

An image quality change from the electrophotographic image α to the electrophotographic image β occurred according to the hardness change of the fixing belt by the heat resistance test. In other words, it can be said that a smaller hardness change of the fixing belt is more advantageous for the maintenance of the image quality.

It should be noted that the electrophotographic images α and β were each formed on substantially the entire surface of A4-size printing paper (trade name: PB PAPER GF-500, manufactured by Canon Inc., 68 g/m$^2$) with a cyan toner and a magenta toner at a density of 100%. The images were defined as images for an evaluation. The electrophotographic image α and the electrophotographic image β were compared with each other by visual observation, and the degree of the image quality change was evaluated based on the following four stages. As a result, the image quality change was evaluated as B.

<Image Quality Change Evaluation Criteria>

Whether or not the image quality change was acknowledged was judged by five subjects through visual observation and evaluated by the following criteria.

A: All the five subjects judged "the image quality change is small."

B: Four of the subjects judged "the image quality change is small."

C: Three of the subjects judged "the image quality change is small."

D: The number of subjects who judged "the image quality change is small" was two or less.

(Example 2) to (Example 8) and (Comparative Example 1) to (Comparative Example 5)

The ratio (H/Vi) of the number of vinyl groups to the number of Si—H groups in the silicone rubber composition, the thickness of the coating film of the silicone rubber composition, and the kinds and amounts of the heat-conductive filler and the filler for preventing consumption of unsaturated aliphatic group were changed as shown in Table 1. Fixing belts were prepared and evaluated in the same manner as in Example 1 except the foregoing. Table 1 shows the results of the hardness increase ratio ($H_{\mu1}/H_{\mu0}$), the hardness change after the heat resistance test, and the image quality change evaluation for each fixing belt.

It should be noted that in Examples 5 to 8 and Comparative Examples 2 to 5, the following respective fillers were used.

Example 5 and Comparative Example 2: high-purity spherical alumina (trade name: Alunabeads CB-A20S; manufactured by Showa Titanium Co., Ltd.) as the heat-conductive filler, and iron oxide (trade name: SYNTHETIC IRON OXIDE TODA COLOR 180ED; manufactured by TODA KOGYO CORP.) as the filler for preventing consumption of unsaturated aliphatic group Example 6 and Comparative Example 3: high-purity spherical alumina (trade name: Alunabeads CB-A30S; manufactured by Showa Titanium Co., Ltd.) as the heat-conductive filler, and rutile-type titanium oxide (manufactured by Wako Pure Chemical Industries, Ltd.) as the filler for preventing consumption of unsaturated aliphatic group Example 7 and Comparative Example 4: high-purity spherical alumina (trade name: Alunabeads CB-A05S; manufactured by Showa Titanium Co., Ltd.) as the heat-conductive filler Example 8 and Comparative Example 5: high-purity spherical alumina (trade name: Alunabeads CBA25BC; manufactured by Showa Titanium Co., Ltd.) as the heat-conductive filler

TABLE 1

| | Cured silicone rubber thickness (μm) | Blended H/Vi | Amount of heat-conductive filler (alumina vol %) | Filler for preventing consumption of unsaturated aliphatic group | Amount of filler for preventing consumption of unsaturated aliphatic group (part(s) by weight/100 parts by weight of silicone rubber undiluted solution) | Hardness increase ratio ($H_{\mu 1}/H_{\mu 0}$) | Hardness change after heat resistance test | Image quality change |
|---|---|---|---|---|---|---|---|---|
| Example 1 | 300 | 0.45 | 45 | Anatase-type titanium oxide | 0.15 | 2.7 | −2 | B |
| Example 2 | 300 | 0.45 | 45 | Anatase-type titanium oxide | 0.80 | 3.6 | 0 | A |
| Example 3 | 300 | 0.45 | 45 | Anatase-type titanium oxide | 1.50 | 3.7 | 0 | A |
| Example 4 | 300 | 0.45 | 45 | Anatase-type titanium oxide | 4.50 | 3.8 | +1 | A |
| Comparative Example 1 | 300 | 0.45 | 45 | None | — | 1.8 | −10 | C |
| Example 5 | 300 | 0.45 | 45 | Iron oxide | 4.50 | 3.6 | +1 | A |
| Comparative Example 2 | 300 | 0.45 | 45 | Iron oxide | 1.50 | 2.2 | −8 | C |
| Example 6 | 300 | 0.45 | 45 | Rutile-type titanium oxide | 4.50 | 3.3 | −1 | A |
| Comparative Example 3 | 300 | 0.45 | 45 | Rutile-type titanium oxide | 1.50 | 2.1 | −9 | C |
| Example 7 | 100 | 0.3 | 40 | Anatase-type titanium oxide | 0.80 | 5.0 | 0 | A |
| Comparative Example 4 | 100 | 0.3 | 40 | None | — | 2.0 | −8 | C |
| Example 8 | 500 | 0.8 | 60 | Anatase-type titanium oxide | 0.80 | 2.5 | −3 | B |
| Comparative Example 5 | 500 | 0.8 | 60 | None | — | 1.2 | −11 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-167214, filed Jul. 27, 2012, and Japanese Patent Application No. 2013-150189, filed Jul. 19, 2013, which are hereby incorporated by reference herein in their entirety.

REFERENCE SIGNS LIST

1 substrate
2 cured silicone rubber elastic layer
3 fluorine resin surface layer
4 fixing belt
8 elastic pressurizing roller
26 fixing portion
100 printer

What is claimed is:

1. A member for electrophotography, comprising:

a substrate;

a cured silicone rubber elastic layer comprising an unsaturated aliphatic group; and a fluorine resin surface layer obtained by melting a fluorine resin powder on the cured silicone rubber elastic layer, wherein:

when a microhardness of a cured rubber forming the cured silicone rubber elastic layer is defined as $H_{\mu 0}$, and when a microhardness of a rubber obtained by soaking the cured rubber in a methyl hydrogen silicone oil for 24 hours, and then further curing the cured rubber is defined as $H_{\mu 1}$, $H_{\mu 1}/H_{\mu 0}$ is from 2.5 to 5.0.

2. The member for electrophotography according to claim 1, wherein:

the cured silicone rubber elastic layer comprises, as a first filler, at least one selected from the group consisting of a titanium oxide particle, an iron oxide particle, a nickel oxide particle, a cobalt oxide particle, and a chromium oxide particle.

3. The member for electrophotography according to claim 1, wherein:

the cured silicone rubber elastic layer comprises, as a first filler, at least one selected from the group consisting of an iron(III) oxide-containing particle, a rutile-type titanium oxide-containing particle, and an anatase-type titanium oxide-containing particle.

4. The member for electrophotography according to claim 3, wherein:

the cured silicone rubber elastic layer comprises, as the first filler, the anatase-type titanium oxide-containing particle.

5. The member for electrophotography according to claim 4, wherein:

the anatase-type titanium oxide-containing particle is incorporated in an amount of 0.15 part by mass to 4.50 part by mass with respect to 100 parts by mass of an addition-curing-type silicone rubber mixture.

6. The member for electrophotography according to claim 1, wherein:

the cured silicone rubber elastic layer comprises a cured product of an addition-curing-type organopolysiloxane mixture.

7. The member for electrophotography according to claim 6, wherein:

the addition-curing-type organopolysiloxane mixture includes an organopolysiloxane having the unsaturated aliphatic group; and an amount of the unsaturated aliphatic group of the organopolysiloxane is from 0.1 mol % to 2.0 mol % with respect to 1 mol of a silicon atom.

8. The member for electrophotography according to claim 1, wherein:

the cured silicone rubber elastic layer comprises, as a second filler, at least one selected from the group consisting of silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni).

9. A fixing device, comprising:

a fixing member;

a unit for heating the fixing member; and a pressurizing member placed opposite to the fixing member, wherein one, or each of both, of the fixing member and the pressurizing member comprises the member for electrophotography according to claim 1.

10. An electrophotographic image forming apparatus, comprising the fixing device according to claim 9.

* * * * *